Oct. 20, 1964

P. BARENDSEN ETAL 3,153,476

MATERIAL HANDLING MACHINES

Filed June 29, 1962

INVENTORS
PIETER BARENDSEN &
BY KARL BERTIL BERGLUND

ATTORNEY

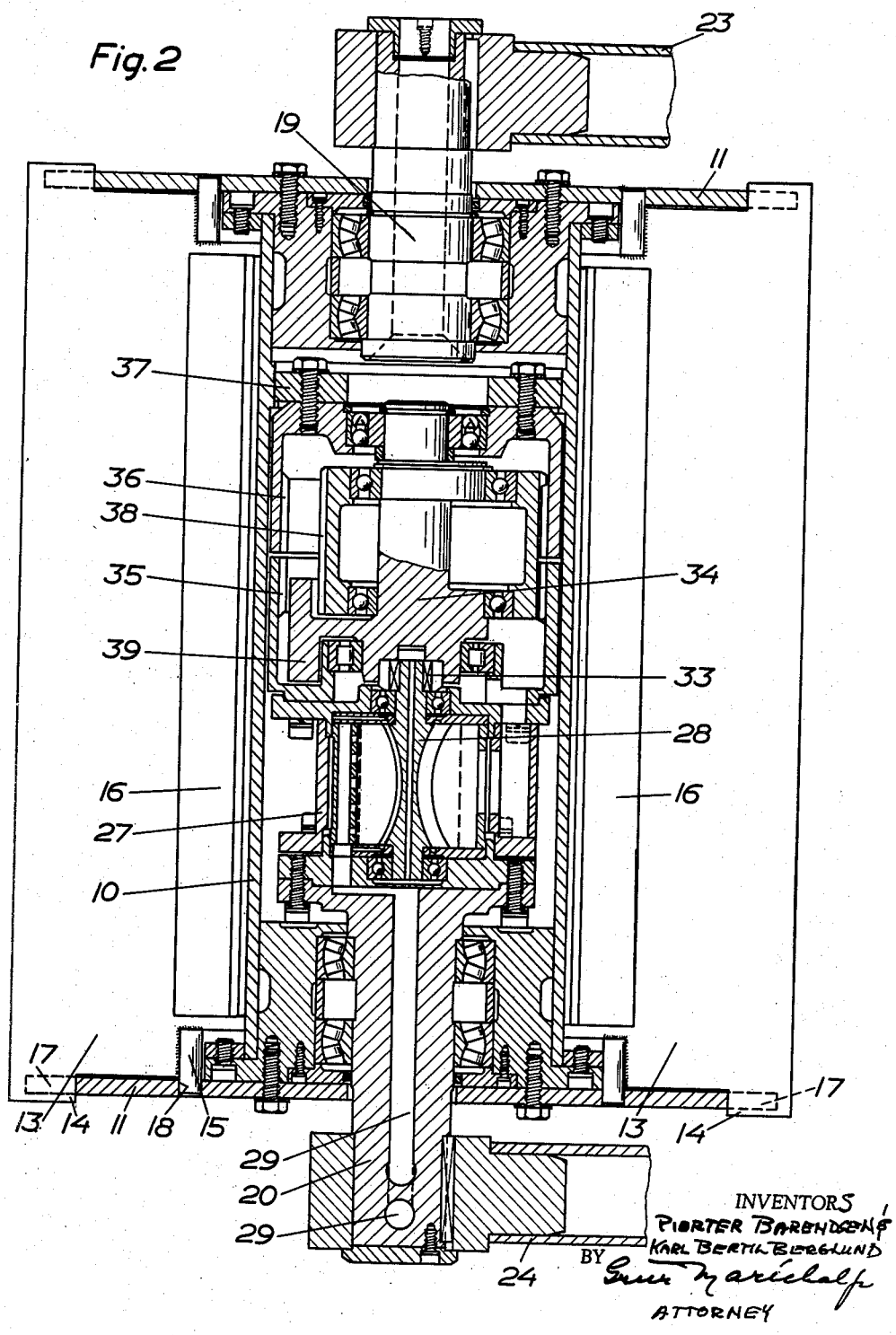

Oct. 20, 1964   P. BARENDSEN ETAL   3,153,476
MATERIAL HANDLING MACHINES
Filed June 29, 1962   3 Sheets-Sheet 3
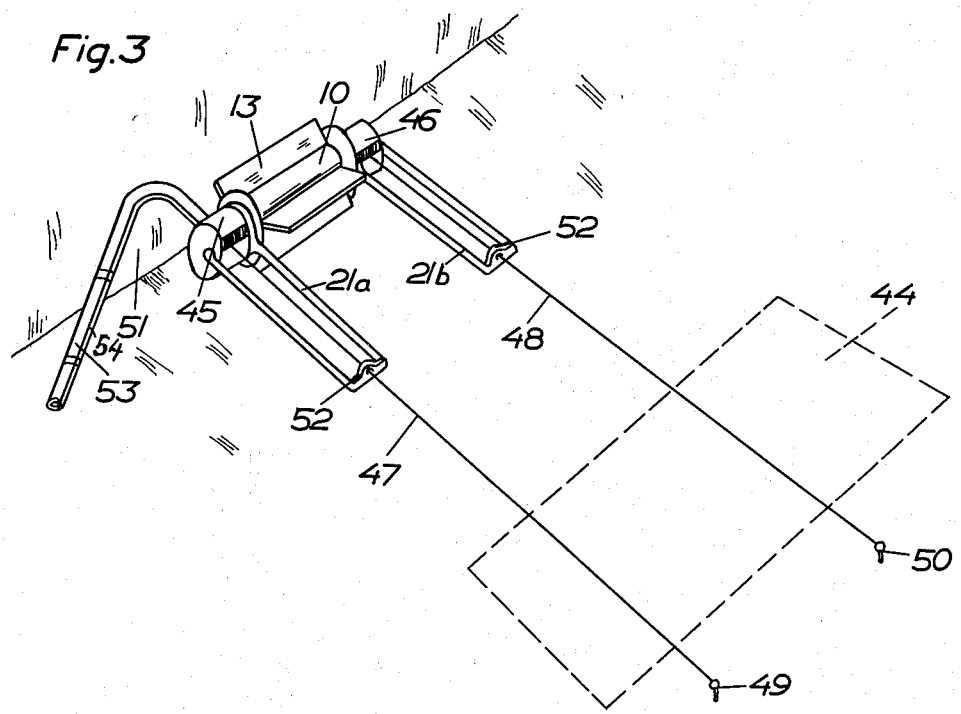
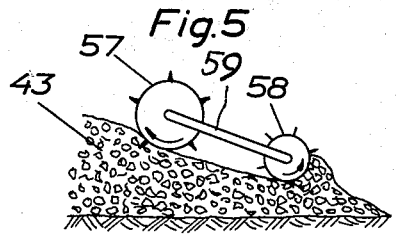
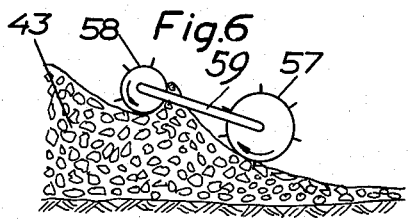
INVENTORS
PIETER BARENDSEN &
BY KARL BERTIL BERGLUND
ATTORNEY 3,153,476
MATERIAL HANDLING MACHINES
Pieter Barendsen, Senderwood, Johannesburg, Transvaal, Republic of South Africa, and Karl Bertil Berglund, Saltsjobaden, Sweden, assignors to Atlas Copco Aktiebolag, Nacka, Sweden, a corporation of Sweden
Filed June 29, 1962, Ser. No. 206,325
Claims priority, application Republic of South Africa July 18, 1961
10 Claims. (Cl. 198—128)

This invention relates to material handling machines of the kind used for moving and loading broken rock or ore or other material in the mining industry and other underground operations and in ships and other localities.

At present a great deal of material handling is done by a combination of scraping and hand loading.

One object of the invention is to obviate the need for hand loading as much as possible. A further object of the invention is to provide a machine that is versatile and adaptable to a wide variety of needs and conditions. A still further object is to provide a machine which is well fitted for operation in narrow localities and/or in localities with low head room. Another object is to eliminate the tail rope and the sheaves and anchoring means therefor which are necessary in conventional scraper installations.

In a preferred embodiment of the invention the scraper comprises a drum having material engaging and moving members projecting from the periphery of the drum, and a yoke, and a motor for rotating the drum relatively to the yoke.

The invention is further described with reference to the accompanying drawings, in which some embodiments of the invention are illustrated by way of example.

FIG. 2 is a longitudinal axial section of a scraper drum as used in FIG. 1.

FIG. 3 is a perspective view of a machine according to another embodiment of the invention.

FIG. 5 and FIG. 6 illustrate combinations of a larger and a smaller drum in push-pull arrangement.

Figure 1:
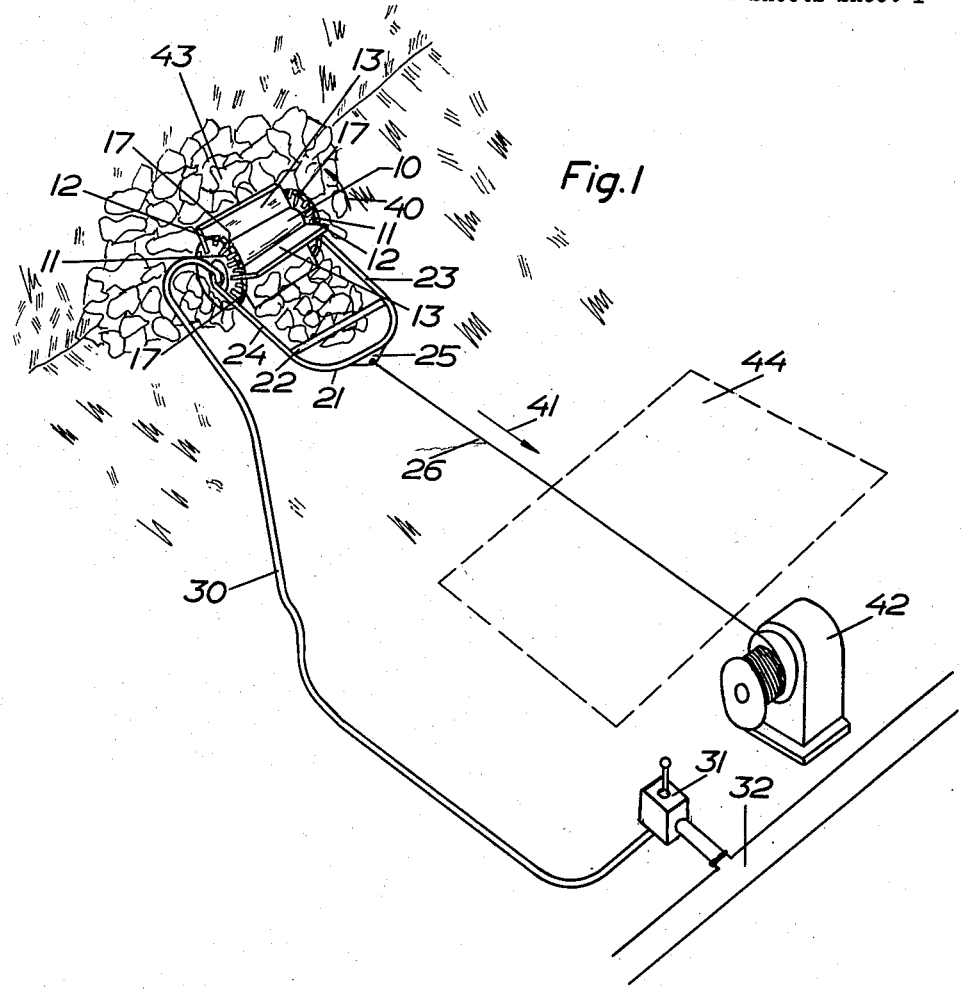
FIG. 1 is a perspective view of a machine according to the invention combined with a winch.

The material handling machine illustrated in FIGURES 1 and 2 is a preferred form of a machine according to the invention. It comprises a scraper drum 10 to which is fitted side walls 11. The side walls 11 are notched at 12 as shown to provide better grip on the ground. Between the side walls 11 there are material engaging and moving members formed as sweeping blades 13, in this case made of hard faced steel, but which can also be made of another suitable material such as hard faced rubber or hard rubber. The blades may have a straight edge or a toothed or otherwise shaped edge as may be suitable with regard to the condition of the material to be handled. The blades may sometimes be replaced by bristles or other members. The blades 13 are formed with tongues 14 that engage in complemental slots 17 in the side walls 11 and also with pins 15 that engage in complemental holes 18 in the side walls.

At its base each blade 13 is sandwiched between two angle irons 16, which are rigidly secured to the blade as by welding. The angle irons help to stiffen the blades 13 and also serve to protect the surface of the drum 10.

Preferably 12 slots 17 may be provided but only four are used in FIG. 1. This arrangement of slots is such that the number of blades, while still being symmetrical about the drum, can be varied among 4, 6 or 8. The smaller number of blades is used for scraping coarse stuff, six for stuff with intermediate coarseness and the large number for finer stuff.

The drum 10 is journalled for rotation on trunnions 19 and 20 and driven by means of a motor housed inside the drum. The trunnions 19, 20 are carried by and secured to a U-shaped yoke 21 stiffened by means of a cross-member 22 and providing two shanks 23 and 24 to which the trunnions 19, 20 are secured. At its forward end the yoke 21 is provided with an eye plate 25 to which a haulage rope 26 may be attached for purposes to be described later on.

The motor in the case illustrated is a variable speed air motor of the reversible type. The motor consists of a stator casing 27 and a sliding vane rotor 28 of conventional design. The motor may, of course, be of any other suitable design, as for instance, an electric motor. The motor 27, 28 communicates through passages 29 in the trunnion 20 with a double hose 30 leading to a suitable control valve 31 which controls the supply of compressed air from an air main 32 to the motor as well as the direction of rotation. The motor stator casing 27 is secured to the trunnion 20 and thereby held against rotation. The rotor 28 is coupled by a spline coupling 33 to an intermediate shaft 34 which is rotatably journalled at one end in the hub of an internally toothed stationary gear ring 35 secured to the stator casing 27. The other end of the shaft 34 is rotatably journalled in the hub of a second internally toothed gear ring 36 which is bolted to a flange 37 welded to the inside of the drum 10. The ring gears have slightly different number of teeth and mesh with a cylindrical externally toothed gear 38 excentrically journalled on the intermediate shaft 34. The shaft 34 and gears 35, 36, 38 form a reduction gear for transmitting rotation from the rotor 28 to the drum 10. For instance if the ring gear 35 has 60 teeth and the ring gear 36 has 59 teeth and one intermediate gear 38 is provided the reduction ratio will be 60 to 1 and the ring gear 36 will rotate in the same direction as the rotor 28. If the gear 36 instead has the greater number of teeth said gear will rotate in opposite direction to the rotor 28. Since one intermediate gear 38 only is provided a counter weight 39 is formed on the shaft 34. If one ring gear has 60 and the other 58 teeth the reduction ratio will be 30:1, and obviously a suitable selection of the number of teeth gives any desired gear ratio and direction of rotation. If two intermediate gears are used the number of teeth of both ring gears must be divisible by two, for instance 60 and 58 giving a reduction ratio of 30:1, but in such a case the counter weight 39 may be dispensed with.

If in use, the drum 10 rotates in the direction of the arrow 40 in FIGURE 1, the drum will tend to move bodily in the direction opposite to that of the arrow 41 in FIGURE 1. If, however, strong traction is applied to the yoke 21, e.g. by means of the winch rope 26 and a winch 42 in the direction of the arrow 41, the drum and yoke will move bodily in the direction of the arrow 41. At the same time the blades 13 will tend to throw material, e.g. from the rock pile 43 shown in FIGURE 1, in the direction of the arrow 41. Pulling the yoke and drum in the direction of the arrow 41 therefore causes the drum to act as a scraper with the additional advantage that the blades also act on the material to be moved from the gathering station 43 to a delivery station 44 from which the material is carried away by a transportation belt or in any other suitable way.

The uses to which the machine thus far described can be put are many and varied. Some modifications of the machine are illustrated in FIGURES 3 to 6, merely by way of example.

In the example of FIGURE 3 a simple application of the machine is shown. This figure is a diagrammatic perspective view of a machine with two winches. The machine has a drum 10 with blades or wings 13 and is provided with two independently operable drum winches 45, 46 carried one at each end of the drum 10. The machine is advanced towards the face 51 under its own power while the brake of the winches is released or reduced. Scraping is effected by pulling the machine by means of the winches 45, 46 and ropes 47, 48 anchored at 49, 50 with the motor of the machine still running in the same direction as when the machine was moving towards the face 51. The yoke in this case is divided in two parts 21a and 21b which form guides 52 for the ropes 47, 48. The machine has a main air supply hose 53 and a number of small hoses 54 for remote control of the winches and the drum motor 27, 28. By varying the braking on the winches 45, 46 during the advance of the machine towards the face the direction of movement may be controlled.

As shown the machine delivers material to a delivery station and a suitable conveyor. Of course, other types of conveying means could be used and in suitable cases scraping could take place parallel to the face.

In the arrangement shown in FIG. 1, the machine has to be manhandled to cause it to change direction when moving towards the face. This difficulty has been overcome in the embodiment of FIG. 3.

Figure 4:
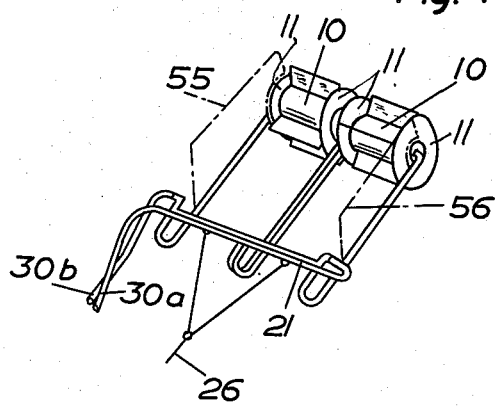
FIG 4 is a perspective view of a machine with two axially aligned drums.

This difficulty may also be overcome by joining two drums 10 side by side as shown in FIG. 4. By varying the speed of one or the other of this pair of drums an action may be obtained permitting control of the direction of movement of the machine. The machine may be provided with two double hoses 30a and 30b for the air supply to the drum motors. Side walls 55, 56 may be secured to the yoke shanks to increase the scraper capacity.

In FIGURES 5 and 6 the combination of two parallel drums 57 and 58 is shown. The trunnions of the drums are connected by yoke members 59 and the drums may be of the same design as the drum 10 in FIGS. 1 and 2. The drum 57, however, is larger than the drum 58 and serves as the locomotive of the combination. In one direction of rotation of the larger drum, see arrows in FIGURE 5, the latter drum 57 pushes the smaller drum 58, which thus acts as a bull-dozer blade, and in the other direction of rotation, illustrated by arrows in FIGURE 6, the smaller drum 58 acts as a drawn scraper blade. If in these cases the larger drum is split into two drums, each with its own variable speed motor, steering can be effected by changing the speed of the motors. The combination shown in FIGURES 5 and 6 needs no winch attachment and only power supply, for instance through a hose or electric cable.

Many more permutations and combinations are possible using a number of self-propelled scraper drums or the like and the invention may be modified in various ways within the scope of the claims.

What we claim is:

1. A self-propelled apparatus of the character described for engaging and removing loose rock and like material from low, relatively inaccessible places, comprising a drum, discs disposed at each end of said drum, a plurality of vanes disposed radially in spaced relationship around the circumference of said drum and extending from one said disc to the other for supporting and propelling said drum upon rotation thereof and for engaging said material, trunnions disposed centrally in each end of said drum with the axes thereof axially aligned with said drum axis and extending through said discs, power means rotatably disposed on said trunnions and affixed inside said drum for revolving said drum on said trunnions and propelling said drum, and means extending from said trunnions for dragging said rotating drum and engaged material away from said relatively inaccessible places.

2. Apparatus as recited in claim 1 in which said power means in said drum includes a reversible motor, flexible power supplying means connected to one of said trunnions and running therethrough for supplying power to said motor, and remote control means connected to said power supply means on the end thereof away from said trunnion and remote from said apparatus for controlling the power supply to said motor.

3. Apparatus as recited in claim 1 in which said radial vanes are composed of a plurality of bristles.

4. A self-propelled apparatus of the character described for engaging and removing loose rock and like material from low, relatively inaccessible places, comprising a drum, discs having a diameter larger than said drum and disposed at each end thereof for supporting said drum in said loose material and for assisting in the engagement of said material, a plurality of vanes disposed radially in spaced relationship around the circumference of said drum and extending from one said disc to the other for supporting and propelling said drum upon rotation thereof and for engaging said material, trunnions disposed centrally in each end of said drum with the axes thereof axially aligned with said drum axis, and extending through said discs, a reversible air motor rotatably disposed on said trunnions and affixed inside said drum for revolving said drum on said trunnions and propelling said drum, and means extending from said trunnions for dragging said rotating drum and engaged material away from said relatively inaccessible places.

5. A self-propelled apparatus of the character described for engaging and removing loose rock and like material from low, relatively inaccessible places, comprising a drum, notched discs having a diameter larger than said drum and disposed at each end thereof for supporting said drum in said loose material and for assisting in the engagement of said material, a plurality of vanes disposed radially in spaced relationship around the circumference of said drum and extending from one said disc to the other for supporting and propelling said drum upon rotation thereof and for engaging said material, trunnions disposed centrally in each end of said drum with the axes thereof axially aligned with said drum axis and extending through said discs, a reversible air motor rotatably disposed on said trunnions and affixed inside said drum for revolving said drum on said trunnions and propelling said drum, a yoke engaging each of said trunnions and extending perpendicularly to the axis thereof, and means connected to said yoke for dragging said rotating drum and engaged material away from said inaccessible places.

6. Apparatus as recited in claim 5 in which said means connected to said yoke for dragging said rotating drum away from said inaccessible place includes a rope and winch for dragging said rotating drum from a material engaging location to a material disposal location.

7. Apparatus as recited in claim 5 in which the stator casing of said motor is secured to said trunnions, and said drum is provided with a reduction gear affixed therein, the rotor of said motor being in driving engagement with said drum through said reduction gear.

8. Apparatus as recited in claim 7 in which the reduction gear comprises a cylindrical externally toothed gear coupled to and driven by said rotor, a first cylindrical internally toothed gear ring having its axis off-set from the axis of said internally toothed gear and meshing therewith and secured to said stator, and a second cylindrical internally toothed gear ring coaxial with said first gear ring and meshing with said externally toothed gear and having different number of teeth than said first gear ring and secured to said drum.

9. A self-propelled apparatus of the character described for engaging and removing loose rock and like material from low, relatively inaccessible places, comprising two axially aligned drums, discs disposed at each end of each said drum, a plurality of vanes disposed radially in spaced relationship around the circumference of said drums and extending from one said disc to the other for supporting and propelling said drums upon rotation thereof and for engaging said material, trunnions disposed centrally in each end of each of said drums with the axes thereof axially aligned with said drum axes and extending through said discs, a reversible air motor rotatably disposed on said trunnions and affixed inside each of said drums for revolving said drums on said trunnions and propelling said drums, yoke means engaging said trunnions and extending perpendicularly to the axes thereof, means connected to said yoke means for dragging said rotating drums and engaged material away from said relatively inaccessible places, flexible power supply means connected to each of said reversible air motors for supplying pressure fluid thereto, and remote control means connected to said power supply means at the end thereof remote from said motors for individually controlling the power supply and speed of said motors for controlling the rotation and direction of movement of said self-propelled apparatus.

10. A self-propelled apparatus of the character described for engaging and removing loose rock and like material from low, relatively inaccessible places, comprising rotating means, notched discs having a diameter larger than said rotating means and disposed at each end thereof for supporting said rotating means in said loose material and for assisting in the engagement of said material, a pluraliy of vanes disposed radially in spaced relationship around the circumference of said rotating means and extending from one said disc to the other for supporting and propelling said rotating means and for engaging said material, power means disposed in said rotating means for rotating and propelling said rotating means and for changing the direction of travel thereof, means connected to each end of said rotating means for dragging said rotating means and said engaged material from said relatively inaccessible area, and remote control means connected to said power means for controlling the operation thereof.

References Cited in the file of this patent

UNITED STATES PATENTS

| | | |
|---|---|---|
| 2,140,105 | Cluster | Dec. 13, 1938 |
| 3,023,440 | Peabody | Mar. 6, 1962 |
| 3,029,926 | Carlson | Apr. 17, 1962 |

FOREIGN PATENTS

| | | |
|---|---|---|
| 1,217,198 | France | Dec. 7, 1959 |
| 1,087,532 | Germany | Aug. 18, 1960 |